June 24, 1958 — A. D. KNUTSEN — 2,839,867
GROUND TRAP FOR BIRDS
Filed April 5, 1957 — 2 Sheets-Sheet 1
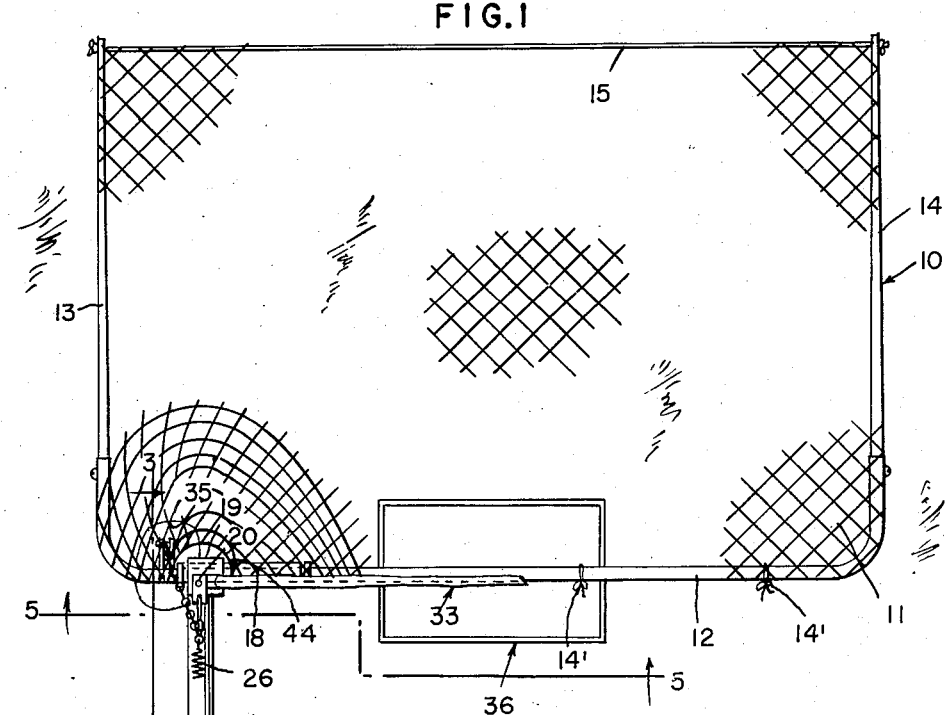
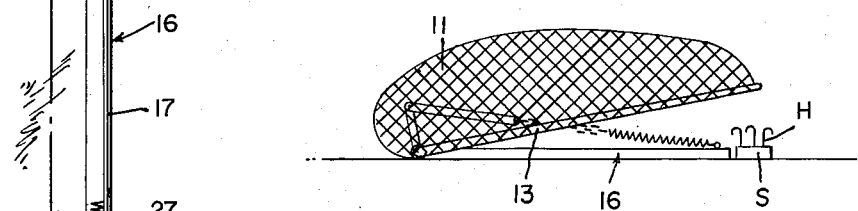
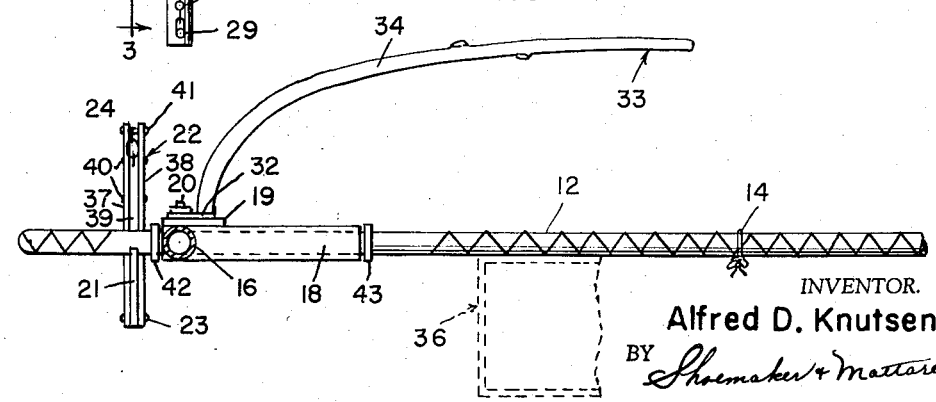
INVENTOR.
Alfred D. Knutsen

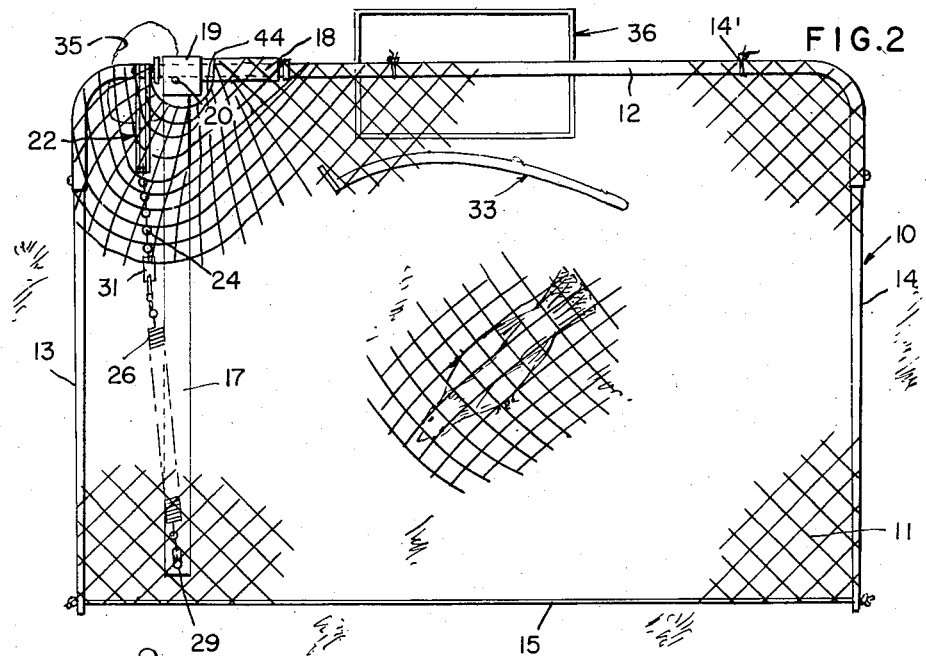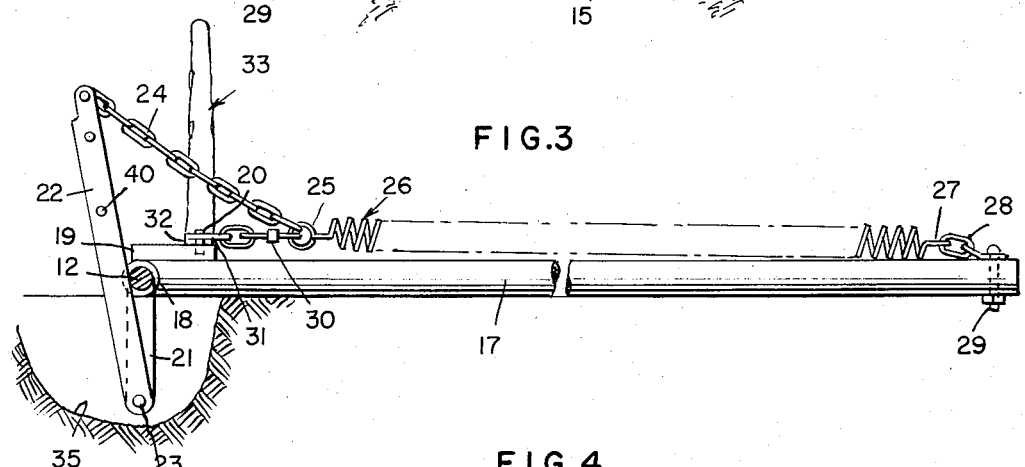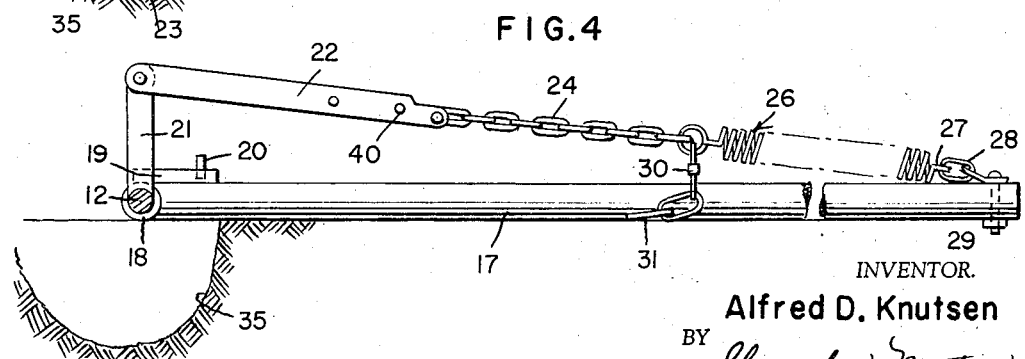

United States Patent Office 2,839,867
Patented June 24, 1958

2,839,867
GROUND TRAP FOR BIRDS
Alfred D. Knutsen, Lansing, Mich.
Application April 5, 1957, Serial No. 650,940
8 Claims. (Cl. 43—62)

This invention relates in general to trapping devices and pertains more particularly to a net type of trap for trapping birds.

To document the migrating and mating habits of birds, it is extremely useful to trap and band as many birds as possible so that a continuing study can be made from year to year and thus establish the habits and characteristics of the birds.

It is, therefore, a primary object of this invention to provide certain improvements in ground trap constructions wherein birds can be effectively trapped without injury thereto for subsequent banding and release for the purposes above described.

Another object of this invention is to provide an improved ground trap for birds of the character described, including an anchor rod or bar, one end of which is pivotally attached to a rigid open framework with which is associated a net element and wherein means is provided between the bar and the framework to spring the framework from a set position adjacent to and subsequently parallel to the bar to a sprung position in which the framework is released for movement into a relationship substantially enclosing the bar and with the net positioned thereover.

Another object of this invention is to provide improvements in ground trap structures for birds embodying a novel triggering assembly.

A further object of this invention is to provide an improved ground trap for birds encompassing an open body-like rigid frame element and in association therewith an anchor band having spring means interconnecting the band and the framework for urging the body structure and an associated net between a set and a released or sprung position for entrapping birds.

Still another object of this invention is to provide an improved trap for birds which embodies an articulated structure hinged substantially in the intermediate portion thereof and which normally lies flat against the ground surface when in the set position and which is adapted to be released such that one portion jack-knifes upon the other and which latter portion carries a net for trapping a bird.

Another object of this invention is to provide an improved ground trap for birds embodying a generally U-shaped rigid frame having a net covering the same and wherein the bight portion of such frame is hingedly connected to one end of an anchor bar and wherein the anchor bar has attached to its free end one end of a tension spring element and the other end of which is normally releasably anchored to a portion adjacent the opposite end of the bar, the frame being provided with a lever arm perpendicular thereto and with link means extending from the lever arm and including a flexible connection to the releasably anchored end of the spring and wherein a trigger element is associated with the anchored end of the spring to release such end of the spring and permit the same to move the frame and associated net into bird entrapping position.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a plan view of the improved ground trap and illustrating the components of the same when the trap is in the set position;

Fig. 2 is a view similar to Fig. 1 but showing the trap in the sprung position;

Fig. 3 is a vertical section taken substantially along the plane of section line 3—3 in Fig. 1 and illustrating the relative position of parts when in the set position and, for the purpose of clarity, omitting any showing of the net;

Fig. 4 is a view similar ot Fig. 3 but showing the position of parts when the trap is in the sprung position; and Fig. 5 is a transverse vertical section taken substantially along the plane of section line 5—5 in Fig. 1 and illustrating details of the trigger assembly.

Fig. 6 is a side elevational view showing the trap in the process of closing and illustrating a modification which may be utilized therewith.

Referring at this time more particularly to Fig. 1, the reference numeral 10 indicates in general the body or frame structure which carries the net element 11 for trapping the birds. The frame structure incorporates a substantially straight bight element 12 and extending from the opposite ends thereof, the spaced generally parallel arms 13 and 14. The net is secured in any suitable manner as, for example, by pieces of cord 14' along the bight and arms and is affixed to the frame in such a manner as to be loose in relation thereto, whereby to form a pocket or pouch within which the entrapped bird is retained. Stretched tautly between the free ends of the arms 13 and 14 is a cord element 15 and the net is secured also to this cord as well as to the various portions of the frame.

Associated with the frame is an anchor bar assembly indicated generally by the reference character 16 and which may conveniently take the form of an elongate length of pipe or similar material 17 which may be filled with lead or the like to render the same sufficiently heavy for the purposes desired as will be hereinafter more readily apparent.

As is shown most clearly in Fig. 3, the end of the anchor bar which is disposed adjacent one side of the bight 12 of the frame, is pivotally attached thereto by means of a sleeve element 18 which is rigidly affixed to the anchor bar so that the frame and anchor bar are free to fold with respect to each other between the substantially coplanar position shown in Fig. 1 to the closed position shown in Fig. 2. The sleeve 18 may be of considerable length to impart lateral stability between the anchor bar and frame, see particularly Figs. 1 and 2, and fixed in overlying relationship to the sleeve 18 and anchor bar at their point of juncture is a plate element 19 carrying an upstanding pin element 20. The bight portion 12 has rigidly affixed thereto a depending lever arm 21, the same depending when the parts are in the position shown in Fig. 1. A link assembly 22 is pivotally connected as by a pin 23 at its lower end to the lower free end of the lever arm 21 and extends upwardly therefrom in the manner shown in Fig. 3 and is connected at its upper end to a flexible element, such as the chain 24 which extends from this upper free end of the link assembly to one end portion 25 of a tension spring element indicated generally by the reference character 26. The opposite end of the spring 27 is secured by suitable means 28 to the remote or free end of the anchor bar 17, the bolt 29 being provided for this purpose.

The first mentioned end 25 of the spring 26 also carries a flexible connector 30 which includes an apertured link element 31 which, when the trap is set, engages over the pin 20 on top of the foot 32 of the trigger assembly indicated generally by the reference character 33. This construction is shown most clearly in Fig. 5. For the purpose of engaging beneath the apertured link 31 and around the pin 20, the foot portion 32 of the trigger assembly is bifurcated to straddle the pin and is sandwiched between the link 31 and the plate 19 and the main body portion 34 of the trigger assembly extends first substantially vertically from the foot and then generally horizontally in substantially overlying relationship to the underlying portion of the bight 12 of the net frame.

Thus, it will be clear that the operation is such that a slight weight or downward force on the generally horizontal portion of the trigger assembly 33 will cause the foot 32 thereof to pry the link member 31 out of engagement with the pin 20 and thus release the spring element 26 which, while in the process of assuming its normally collapsed position as is shown in Fig. 4, will exert a pull on the link assembly 22 and thus, through the lever arm 21, flip the frame 10 from the ground engaging position shown in Fig. 1 to the sprung ground engaging position shown in Fig. 2, thus entrapping a bird therein as is shown in the latter figure.

For the purpose of providing clearance for the lever arm 21 during operation of the device, a small depression 35 is scooped into the ground surface below the lever arm 21 as is shown most clearly in Figs. 3 and 4. For the purpose of enticing a bird to alight on the trigger assembly, 34, a bait pan 36 is disposed in underlying relationship to the generally central portion of the bight 12 and a suitable depression is also scooped in the ground to receive this pan or cage. In this respect, the assembly 36 may be merely an open top tray or the like for receiving bits of meat or other suitable bait or it may be an enclosed cage for containing live bait.

The link assembly 22, as can be seen most clearly in Fig. 5, may be constructed of three strips of suitable metal, the two outer strips 37 and 38 and an intermediate strip 39 suitably secured together as by rivets 40, with the intermediate strip 39 being of a length less than either of the outer strips so that the outer strips form a bifurcation at their upper end carrying the pin 41 to which the previously mentioned flexible element 24 is attached. Likewise, the outer strips form a bifurcation at the lower end and receive therebetween the lever arm 21 and permit the pivotal attachment by means of the pin 23 previously described.

Fig. 5 also illustrates the disposition of the sleeve 18 with respect to the bight portion 12 and the locating washers 42 and 43 fixed to the bight portion adjacent the opposite ends of the sleeve 18 and serving to locate the same.

As can be seen most clearly in Figs. 1 and 2, it is preferred that the net 11 provide an opening 44 in the region of the lever arm 21 and the link assembly 22.

In using the device, the same is laid out on the ground with the anchor bar and the frame disposed in a position shown in Fig. 1. The spring 26 is stretched to its full length and the link 31 engaged over the pin 20 to retain the spring in its stretched position, with the trigger 33 being placed such that its foot 32 is sandwiched between the plate 19 and the link 31. When a bird alights on the trigger, the link 31 will be released from the pin 20 and the spring 26 will then actuate to flip the frame and the net into the position shown in Fig. 2, Fig. 2 illustrating a bird entrapped by the net.

The trap as shown in Fig. 6 will be seen to be in the process of closing and this figure clearly illustrates the manner in which the net 11 balloons to form an entrapping hood over the bird when the trap is sprung. This is, of course, accomplished by virtue of the fact that the body of the net is lose within the frame and is not stretched tautly thereover, as was previously described. The opening 44 in the net which provides clearance for the operating levers is preferably tied up to much smaller dimensions than that shown in Fig. 1, for example, so as to make absolutely certain there will be no opening large enough in the net to permit the entrapped bird to escape.

It is to be appreciated, also, that the cords 14' are illustrative only of the principle which is to be applied, namely, that the net is securely fastened to the bordering frame throughout its marginal edge portions. Alternatively, a single length of cord could be looped in spiral fashion about the entire frame and passed through adjacent meshes of the net.

Similarly, other modifications may be made to the construction without departing from the spirit of this invention. For example, the height of the trigger assembly 33 as is shown in Fig. 5, may be altered in accordance with the particular type of bird which is being trapped. Some of the larger birds would be more prone to alight on the ground surface rather than on the trigger assembly itself and for this reason the trigger assembly may be made much lower and may be forked so as to extend over a large area of the pan or cage which contains the bait so that even if the bird alights on the ground, in the process of reaching the bait, the trigger will be engaged by the bird so that the trap is sprung. In general, when a pan is used to contain the bait, such as fish or the like, it is desirable that the pan be recessed in the ground such that its top edge is substantially flush with the ground surface and in this case, the trigger assembly is preferably set lower than that shown in Fig. 5. On the other hand, when a cage set is used, with the cage resting on the ground surface and extending for some distance thereabove, the trigger may be at substantially the same height as is shown in Fig. 5. However, it is to be understood that many variations may be made both in the trigger height and specific construction thereof, always bearing in mind that the object of having the bird engage a trigger while attempting to get to the bait must be maintained.

Fig. 6 shows a modification which may be utilized in conjunction with the invention particularly where larger birds are to be contended with. In this figure, it will be seen that a strap S is laid upon the ground surface in the particular position shown and which is provided with a series of inverted hooks H upstanding from its upper surface. The purpose of these hooks is that, when the trap is fully closed, the hooks will become entangled in the meshes of the net and the cross piece 15 thereof such as to serve to maintain the frame against the ground surface and prevent the bird, particularly larger and more powerful birds, from escaping from the net. In connection with this, it is to be appreciated that the strap S which may be formed of wood or the like, must be securely anchored to the ground. Likewise, the frame itself may be anchored to the ground through the medium of cross piece portion 12 and the anchor bar 16 may also be securely anchored to the ground when the trap is contemplated for use with larger birds or at any time such as it may be desirable to do so.

I claim:

1. A ground trap for birds comprising a net assembly and an anchor assembly hingedly connected together for movement between a substantially flat and unfolded set position and a folded sprung position, a tension spring secured to one of said assemblies, said spring being anchored at one end to said one of said assemblies and releasably anchored at its opposite end to the same assembly when the trap is in the set position, means connecting said opposite end of the spring to the other assembly to cause the trap to assume the sprung position when said opposite end of the spring is released, and a trigger for releasing said opposite end of the spring.

2. A ground trap for birds comprising a generally U-shaped rigid frame including a pair of arms joined by a bight portion, a net peripherally secured to said frame and loosely gathered within the confines of the frame to define a hood-like member for entrapping a bird, a weighted anchor bar hingedly secured at one end to the bight portion of said frame and extending substantially at right angles thereto coplanar with but in the opposite direction to the arms of said frame, a tension spring fixed to said bar adjacent the end thereof remote from said frame, an upstanding pin carried by said bar adjacent the bight of said frame, an apertured link carried by the opposite end of said spring and engaged over said pin to hold the spring in stretched position, a trigger assembly having a bifurcated end portion straddling said pin beneath said link and having a generally horizontally disposed portion positioned laterally of said bifurcated end and presenting a perch for a bird whereby the weight of a bird will raise said link out of its engaged condition over said pin to release said spring, and means interconnecting said spring and said frame for urging the frame into folded position upon said anchor bar when the spring is released.

3. A ground trap for birds comprising a generally U-shaped rigid frame including a pair of arms joined by a bight portion, a net peripherally secured to said frame and loosely gathered within the confines of the frame to define a hood-like member for entrapping a bird, a weighted anchor bar hingedly secured at one end to the bight portion of said frame and extending substantially at right angles thereto coplanar with but in the opposite direction to the arms of said frame, a tension spring fixed to said bar adjacent the end thereof remote from said frame, an upstanding pin carried by said bar adjacent the bight of said frame, an apertured link carried by the opposite end of said spring and engaged over said pin to hold the spring in stretched position, a trigger assembly having a bifurcated end portion straddling said pin beneath said link and having a generally horizontally disposed portion positioned laterally of said bifurcated end and presenting a perch for a bird whereby the weight of a bird will raise said link out of its engaged condition over said pin to release said spring and means interconnecting said spring and said frame for urging the frame into folded position upon said anchor bar when the spring is released, said means including a lever fixed to and depending from said bight portion of the frame, a link pivoted at one end to the free end of said lever, and a flexible member secured to the opposite end of the last mentioned link and extending therefrom to a point of connection at said opposite end of the spring.

4. A ground trap for birds comprising a frame having a net secured thereto and forming a hood-like assembly for entrapping a bird, an elongate, weighted anchor bar pivoted at one end to said frame and extending laterally therefrom in generally coplanar relation therewith, an upstanding pin fixed to said bar adjacent the pivotal connection thereof to said frame, tension spring means fixedly anchored at one end adjacent the free end of said bar and releasably anchored at the opposite end over said pin, a trigger assembly for releasing said spring and including a part engaging under that part of the spring means engaged over said pin whereby actuation of the trigger will pry such part of the spring means out of engagement with the pin to release the spring means, and means connecting said frame and said spring means such that when the latter is released, the frame will be urged into folded-over position with respect to the anchor bar.

5. A ground trap for birds comprising a frame having a net secured thereto and forming a hood-like assembly for entrapping a bird, an elongate, weighted anchor bar pivoted at one end to said frame and extending laterally therefrom in generally coplanar relation therewith, an upstanding pin fixed to said bar adjacent the pivotal connection thereof to said frame, tension spring means fixedly anchored at one end adjacent the free end of said bar and releasably anchored at the opposite end over said pin, a trigger assembly for releasing said spring and including a part engaging under that part of the spring means engaged over said pin whereby actuation of the trigger will pry such part of the spring means out of engagement with the pin to release the spring means, and means connecting said frame and said spring means such that when the latter is released, the frame will be urged into folded-over position with respect to the anchor bar, the last means including a lever fixed to and depending from the frame, a link pivoted at one end to the free end of said lever, and a flexible element connecting the other end of said link with the spring means.

6. A ground trap for birds comprising a generally U-shaped rigid frame having a pair of spaced parallel arms interconnected at one end by a bight portion, a net rigidly attached to said frame and including a portion extending tautly between the free ends of said arms whereby the peripheral portion of said net is rigidly fixed and with the intermediate portion of the net being loosely associated with the frame so as to define a hood-like pocket for trapping a bird, an elongate weighted bar pivotally secured at one end to said bight portion adjacent one of said arms and extending perpendicular to said bight portion, said bar and said frame being disposed in a substantially common plane when the trap is set, an elongate tension spring fixed at one end thereof to the free end of said bar and being disposed in stretched condition such that its opposite end extends closely adjacent the opposite end of said bar, an upstanding pin secured to said opposite end of the bar, said opposite end of the spring having means associated therewith engaged over said pin, a flexible element extending from said opposite end of the spring and fastened to a rigid elongate link at one end thereof, said link extending downwardly from its point of connection to said flexible element and being pivotally secured at its lower end to a lever rigid with said bight portion of the frame and extending in depending relation thereto whereby when the spring is released, the frame together with the net will be sprung to a folded overlapped position with respect to said bar, and means for releasing the spring assembly from said pin, the last mentioned means including a generally L-shaped trigger bar having a bifurcated foot portion at one end straddling said pin in underlying relationship to the means associated with said opposite end of the spring engaged over said pin and including a generally horizontally disposed portion defining a perch for a bird whereby when a bird rests upon said perch portion the spring will be released from said pin.

7. The trap as defined in and by claim 6 including a generally rectangular plate secured to said opposite end of the bar, said pin being fixed in upstanding relationship to said plate and the bifurcated end portion of said trigger means being disposed on top of said plate and underlying the means associated with said opposite end of the spring which is engaged over the pin.

8. The trap as defined in and by claim 7 wherein said means associated with the opposite end of the spring includes a generally rectangular rigid link element having an aperture therethrough receiving said pin and serving to sandwich said bifurcated end portion of the trigger assembly between the same and said plate upon which said pin is mounted.

No references cited.